United States Patent
Konda et al.

(10) Patent No.: US 8,851,991 B2
(45) Date of Patent: Oct. 7, 2014

(54) GAME DEVICE, GAME DEVICE CONTROL METHOD, PROGRAM, AND INFORMATION STORAGE MEDIUM

(75) Inventors: Tomoki Konda, Chiba (JP); Tadaaki Tsunashima, Fujisawa (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 649 days.

(21) Appl. No.: 12/663,453

(22) PCT Filed: Feb. 5, 2008

(86) PCT No.: PCT/JP2008/051821
§ 371 (c)(1),
(2), (4) Date: Dec. 7, 2009

(87) PCT Pub. No.: WO2008/149577
PCT Pub. Date: Dec. 11, 2008

(65) Prior Publication Data
US 2010/0173707 A1 Jul. 8, 2010

(30) Foreign Application Priority Data

Jun. 7, 2007 (JP) ................................. 2007-151320

(51) Int. Cl.
*A63F 13/00* (2014.01)
*G06T 13/40* (2011.01)
*A63F 13/40* (2014.01)

(52) U.S. Cl.
CPC ......... *G06T 13/40* (2013.01); *A63F 2300/6607* (2013.01); *A63F 2300/6018* (2013.01); *A63F 13/10* (2013.01)
USPC .................... 463/32; 463/30; 463/29; 463/40

(58) Field of Classification Search
USPC ......................................... 463/29, 30, 32, 40
See application file for complete search history.

(56) References Cited

U.S. PATENT DOCUMENTS 6,317,130 B1    11/2001    Ishikawa et al.
7,106,334 B2    9/2006    Imagawa et al.
(Continued)

FOREIGN PATENT DOCUMENTS

CN    1461460 A    12/2003
JP    10-188028 A    7/1998
(Continued)

OTHER PUBLICATIONS

Korean Office Action corresponding to Korean Patent Application No. 10-2009-7011641, dated Apr. 14, 2011.
(Continued)

*Primary Examiner* — Paul A D'Agostino
*Assistant Examiner* — Brandon Gray
(74) *Attorney, Agent, or Firm* — Sughrue Mion, PLLC

(57) ABSTRACT

To provide a game device having a character transformation function and in which prevention of unnatural display of change of posture and facial expression of a character object is realized while suppressing increase in an amount of data and an amount of work related to motion data. In the present invention, a skeleton part (joint or bone) which is set for a character object placed in a virtual three-dimensional space is rotated so that a position of a predetermined vertex of the character object changes from a first position to a second position. In the present invention, a player is guided to change at least one of the first position and the second position. In a case where at least one of the first position and the second position is changed by the player, the position of the skeleton part is corrected so that the position of the predetermined vertex of the character object changes from the first position to the second position in a case where the skeleton part is rotated by a predetermined angle (S103, S104).

15 Claims, 11 Drawing Sheets

(56) References Cited

U.S. PATENT DOCUMENTS

| | | | |
|---|---|---|---|
| 7,331,856 B1* | 2/2008 | Nakamura et al. | 463/7 |
| 2003/0078086 A1* | 4/2003 | Matsuyama et al. | 463/3 |
| 2005/0137015 A1* | 6/2005 | Rogers et al. | 463/42 |
| 2008/0001951 A1* | 1/2008 | Marks et al. | 345/474 |

FOREIGN PATENT DOCUMENTS

| | | |
|---|---|---|
| JP | 10-340354 A | 12/1998 |
| JP | 10340354 A | 12/1998 |
| JP | 2002-319035 A | 10/2002 |
| JP | 2007-082677 A | 4/2007 |
| TW | 200719280 A | 5/2007 |

OTHER PUBLICATIONS

Taiwanese Office Action issued in Taiwanese Application No. 097116592 dated Sep. 27, 2011.

Gaspard Breton, et al.: "FaceEngine a 3D facial animation engine for real time applications", Proceedings of the sixth international conference on 3D Web technology, Paderton, Germany, 2001, pp. 15-22.

Extended European Search Report dated Sep. 10, 2012 issued in European Patent Application No. 08704448.3.

* cited by examiner

| TRANSFORMATION PARAMETER (p) | POSITION CORRECTION PARAMETER (Δl) |
|---|---|
| ... | ... |
| −2 | L2 |
| −1 | L1 |
| 0 | 0 |
| 1 | −L1 |
| 2 | −L2 |
| ... | ... |

FIG.13
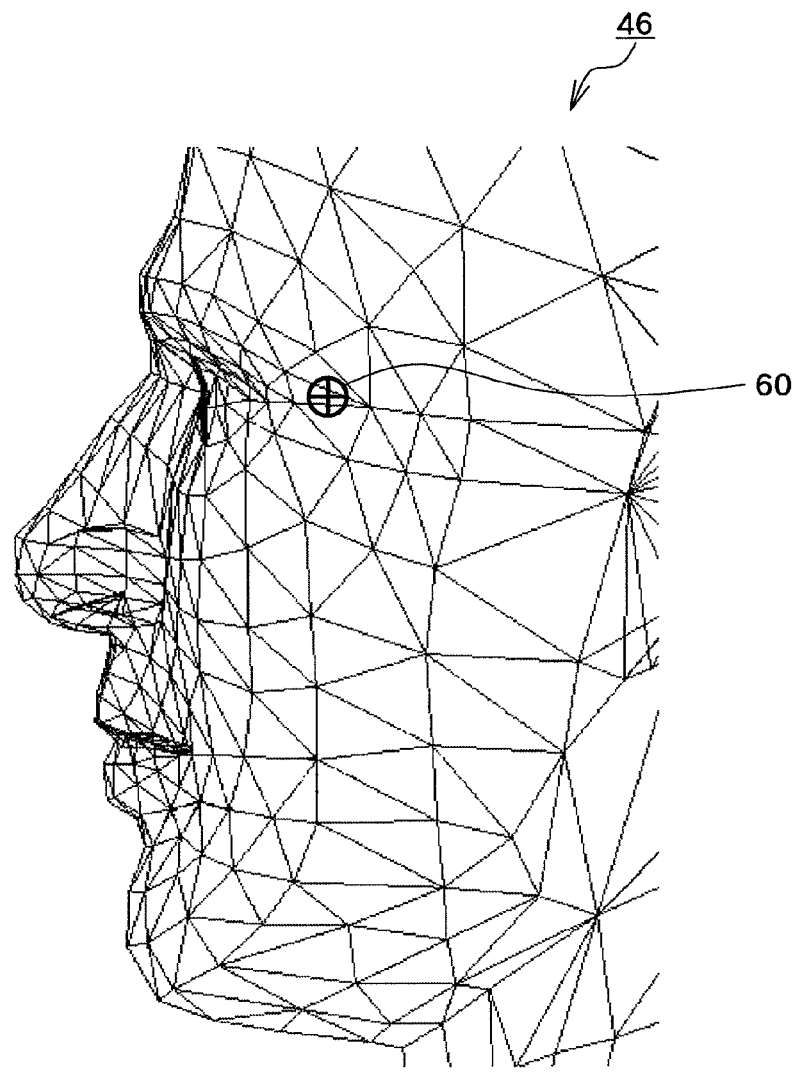
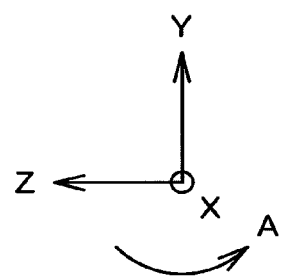

US 8,851,991 B2

GAME DEVICE, GAME DEVICE CONTROL METHOD, PROGRAM, AND INFORMATION STORAGE MEDIUM

TECHNICAL FIELD

The present invention relates to a game device, a game device control method, a program, and an information storage medium.

BACKGROUND ART

There is known a game device for displaying an image representing a scene obtained by viewing a virtual three-dimensional space in which a character object from a given viewpoint. For example, there is known a game device which realizes a soccer game by displaying an image of a scene obtained by viewing a virtual three-dimensional space in which a character object representing a soccer player is placed from a given viewpoint.

In such a game device, in order to change the posture and the facial expression of the character object, a plurality of skeleton parts are set for the character object. The skeleton comprises a joint which corresponds to a joint portion and a bone which connects between joints. To each joint and bone, at least some of vertices of polygons forming the character object are correlated. When the states (position and rotational angle) of the joint and the bone change, the positions of the vertices correlated to the joint and the bone change based on the changes of the states of the joint and the bone. That is, the posture and the facial expression of the character object change.

FIG. 10 shows an example of a head portion 46a of a character object 46. FIGS. 11 and 12 show example states of an eye 50 of the character object 46. FIG. 11 shows a state where the eye 50 of the character object 46 is completely opened and FIG. 12 shows a state where the eye 50 of the character object 46 is completely closed. Reference numeral 52 represents an upper eyelid of the eye 50 of the character object 46, and reference numeral 56 represents a lower eyelid of the eye 50 of the character object 46. In addition, reference numeral 54 represents a representative vertex among the vertices of the upper eyelid 52, and reference numeral 58 represents a representative vertex among the vertices of the lower eyelid 56.

FIG. 13 shows an example of a skeleton which is set for the character object 46 comprising a plurality of polygons. FIG. 13 shows a joint 60 for controlling opening and closing of the eye 50 of the character object 46. In the character object 46, for example, a joint, a bone, or the like for controlling opening and closing of the mouth of the character object 46 are also set, but these are not shown in FIG. 13.

To the joint 60, for example, vertices (representative vertex 54 or the like) of the upper eyelid 52 of the character object 46 are correlated. The positions of the vertices of the upper eyelid 52 change according to the state (rotational angle) of the joint 60. In other words, the vertices of the upper eyelid 52 move according to the joint 60. FIG. 14 is a diagram for explaining a relationship between the upper eyelid 52 of the character object 46 and the joint 60. In the state where the eye 50 of the character object 46 is completely opened (refer to FIG. 11), if the joint 60 rotates with the X axis as a rotational axis, in an A direction (refer to FIG. 13), by a predetermined angle θc (for example, 30°), the upper eyelid 52 of the character object 46 moves to the lower eyelid 56. For example, the representative vertex 54 (predetermined vertex) of the upper eyelid 52 moves from a base position (first position) to a position (second position) of the representative vertex 58 of the lower eyelid 56. Thus, a state where the eye 50 of the character object 46 is completely closed is realized (refer to FIG. 12). On the other hand, in the state where the eye 50 of the character object 46 is completely closed (refer to FIG. 12), if the joint 60 rotates with the X axis as the rotational axis, in a direction opposite to the A direction (refer to FIG. 13), and by a predetermined angle θc (for example, 30°), the upper eyelid 52 of the character object 46 returns to the base position. In other words, the state returns to a state where the eye 50 of the character object 46 is completely open (refer to FIG. 11).

In the above-described game device, the joint and the bone are controlled by motion data. The motion data is data defining changes of states of the joint and bone in a case where the posture and facial expression of the character object 46 are changed. For example, the motion data during closing of the eye 50 of the character object 46 is data defining a change of the rotational angle of the joint 60 for every predetermined period (for example, every 1/60$^{th}$ of a second). The motion data is, for example, the data indicating that the joint 60 is gradually rotated with the X axis as the rotational axis, in the A direction, until the rotational angle of the joint 60 reaches a predetermined angle θc (for example, 30°). With the joint 60 rotating according to the motion data, the scene of the character object 46 closing the eye 50 is shown on the game screen.

In addition, the game device as described above may sometimes have a character transformation function, that is, a function to allow a player to change a model shape of the character object 46. For example, in some cases, the player can change the size (narrowness) of the eye 50 of the character object 46.

[Patent Document] JP 2007-082677 A

DISCLOSURE OF THE INVENTION

Problems to be Solved by the Invention

In a case where the model shape of the character object 46 is changed by the player through the character transformation function as described above, the changes of the posture and the facial expression of the character object 46 may appear unnatural.

For example, in a case where the narrowness of the eye 50 of the character object 46 (length of the eye 50 in the vertical direction) is changed, the rotational angle of the joint 60 required for the change of the eye 50 of the character object 46 from the completely open state to the completely closed state would also change. Here, it is assumed that the rotational angle of the joint 60 necessary for the eye 50 of the character object 46 to change from the completely open state to the completely closed state is 30° for the case where the eye 50 of the character object 46 has an initial shape (shape before the change by the player). For example, in a case where the eye 50 of the character object 46 is transformed to a shape narrower than the initial shape, if the joint 60 is rotated with the X axis as the rotational axis, in the A direction, and by 30°, the upper eyelid 52 may penetrate through the lower eyelid 56. Alternatively, for example, in a case where the eye 50 of the character object 46 is set larger than the initial shape, the eye 50 of the character object 46 would not be put in the completely closed state with only the rotation of the joint 60 with the X axis as the rotational axis and by 30°. In either case, the player may feel an impression that the scene of the closing of the eye 50 of the character object 46 is unnatural.

As a method of reducing the above-described disadvantage, a method may be considered in which a plurality of types of motion data are prepared according to the narrowness of the eye 50, and the motion data used in a case where the eye 50 of the character object 46 is closed. However, in this case, the amount of data of the motion data is increased and the amount of work related to the motion data generation is also increased.

The present invention was conceived in view of the above-described circumstances, and an advantage of the present invention is that a game device, a game device control method, a program, and an information storage medium are provided which can prevent unnaturalness of the changes of the posture and facial expression of the character object in a game device having a character transformation function while suppressing the increase in the amount of data and amount of work related to the motion data.

Means for Solving the Problems

In order to attain the above described object, a game device according to the present invention is a game device in which a skeleton part which is set for a character object placed in a virtual three-dimensional space is rotated so that a position of a predetermined vertex of the character object changes from a first position to a second position, the game device comprising guiding means for guiding a player to change at least one of the first position and a second position, and correcting means for correcting, in a case where at least one of the first position and the second position is changed by the player, a position of the skeleton part so that the position of the predetermined vertex of the character object changes from the first position to the second position in a case where the skeleton part is rotated by a predetermined angle.

Also, a game device control method according to the present invention is a method of controlling a game device in which a skeleton part which is set for a character object placed in a virtual three-dimensional space is rotated so that a position of a predetermined vertex of the character object changes from a first position to a second position, the method comprising a guiding step in which a player is guided to change at least one of the first position and the second position, and a correcting step in which, in a case where at least one of the first position and the second position is changed by the player, the position of the skeleton part is corrected so that the position of the predetermined vertex of the character object changes from the first position to the second position in a case where the skeleton part is rotated by a predetermined angle.

Also, a program according to the present invention is a program for causing a computer such as a consumer game device, a portable game device, a commercial game device, a portable phone, a personal digital assistant (PDA), and a personal computer to function as a game device in which a skeleton part which is set for a character object placed in a virtual three-dimensional space is rotated so that a position of a predetermined vertex of the character object changes from a first position to a second position, the program for causing the computer to function as guiding means for guiding a player to change at least one of the first position and the second position, and correcting means for correcting, in a case where at least one of the first position and the second position is changed by the player, a position of the skeleton part so that the position of the predetermined vertex of the character object changes from the first position to the second position in a case where the skeleton part is rotated by a predetermined angle.

Also, a computer-readable information storage medium according to the present invention is a computer-readable information storage medium which stores the above described program. A program distribution device according to the present invention is a program distribution device which comprises an information storage medium which stores the above described program, which reads the program from the information storage medium, and which distributes the program. A program distributing method according to the present invention is a program distributing method in which the program is read from an information storage medium which stores the above described program, and distributed.

The present invention relates to a game device in which a skeleton part (joint or bone) which is set for a character object placed in a virtual three-dimensional space rotates so that a position of a predetermined vertex of the character object changes from a first position to a second position. In the present invention, a player is guided to change at least one of the first position and the second position. When at least one of the first position and the second position is changed by the player, the position of the skeleton part is corrected so that a position of the predetermined vertex of the character object changes from the first position to the second position in a case where the skeleton part is rotated by a predetermined angle. According to the present invention, in a game device having a character transformation function, it is possible to prevent unnaturalness of the change of the posture and the facial expression of the character object while suppressing the increases in the amount of data and the amount of work related to the motion data.

Also, according to one aspect of the present invention, the correcting means may comprise means for storing position correction data in which a condition related to at least one of the first position and the second position, and correction information which is a basis for correction of the position of the skeleton part, are correlated, and may correct the position of the skeleton part based on the correction information corresponding to the condition satisfied by at least one of the first position and the second position in a case where at least one of the first position and the second position is changed by the player.

Also, according to one aspect of the present invention, the condition may be a condition related to a distanced between the first position and the second position.

Also, according to one aspect of the present invention, the correction information may be information indicating a movement distance of the skeleton part in a predetermined direction, and the correcting means may move the skeleton part in the predetermined direction by a movement distance indicated by the correction information corresponding to the condition satisfied by at least one of the first position and the second position.

BRIEF DESCRIPTION OF THE DRAWINGS

FIG. 13 is a diagram showing an example of a skeleton which is set in a character object.

BEST MODE FOR CARRYING OUT THE INVENTION

An embodiment of the present invention will now be described in detail with reference to the drawings. A game device according to the embodiment of the present invention is realized, for example, with a consumer game device, a portable game device, a portable phone, a personal digital assistant (PDA), or a personal computer. Here, an example configuration in which the game device according to the embodiment of the present invention is realized with a consumer game device is described.

Figure 1:
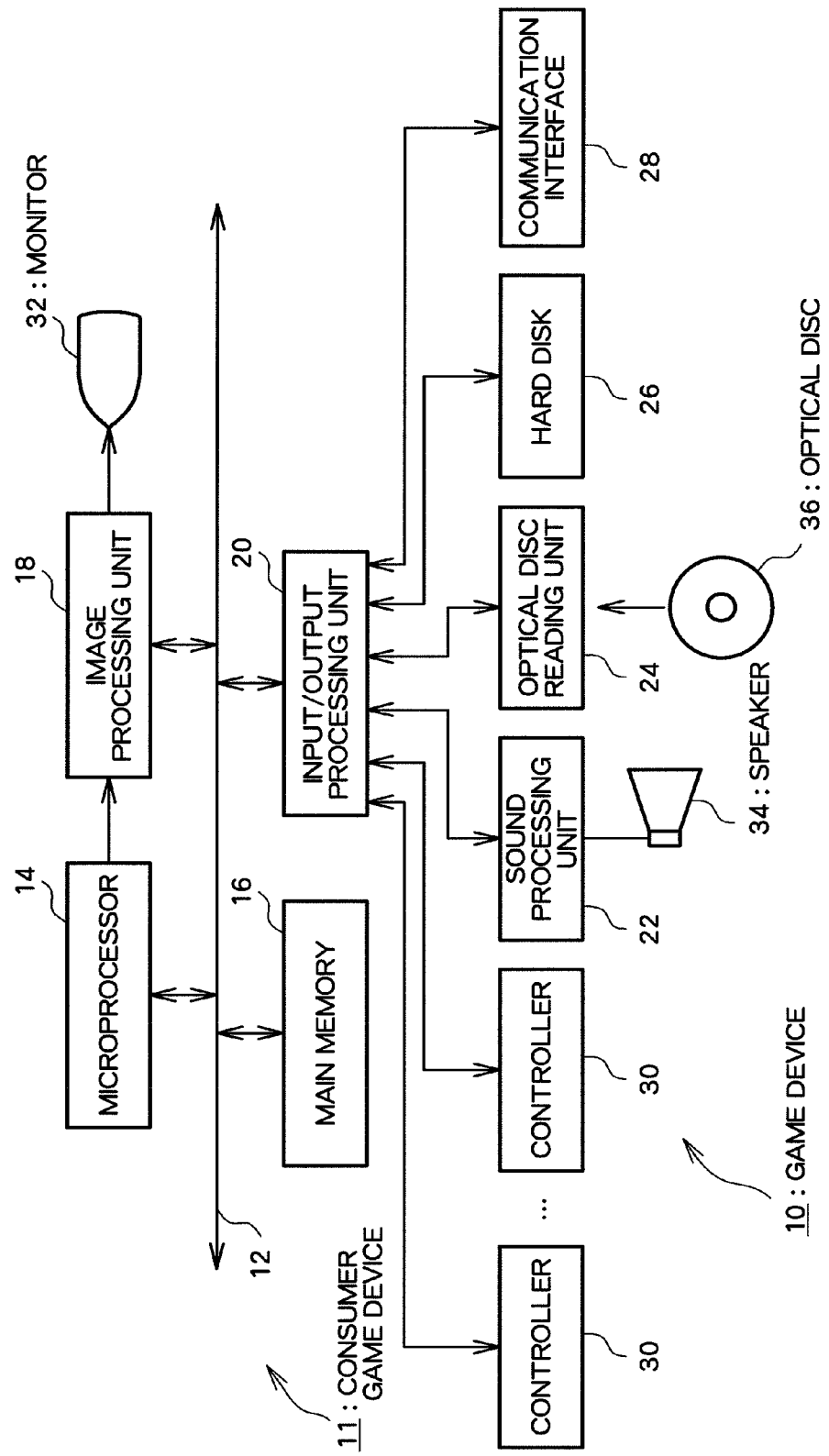
FIG. 1 is a diagram showing a hardware structure of a game device according to an embodiment of the present invention.

FIG. 1 is a diagram showing an overall structure of a game device according to the embodiment of the present invention. A game device 10 shown in FIG. 1 comprises a consumer game device 11, a monitor 32, a speaker 34, and an optical disc 36. The monitor 32 and the speaker 34 are connected to the consumer game device 11. As the monitor 32, for example, a consumer television receiver is used. As the speaker 34, for example, a speaker built into the consumer television receiver is used. The optical disc 36 is an information storage medium, and is equipped in the consumer game device 11.

The consumer game device 11 is a known computer game system. The consumer game device 11 comprises a bus 12, a microprocessor 14, a main memory 16, an image processing unit 18, an input/output processing unit 20, a sound processing unit 22, an optical disc reading unit 24, a hard disk 26, a communication interface 28, and a controller 30. The constituent elements other than the controller 30 are stored in a housing of the consumer game device 11.

The bus 12 is provided for exchange of addresses and data among the elements of the consumer game device 11. The microprocessor 14, the main memory 16, the image processing unit 18, and the input/output processing unit 20 are connected by the bus 12 to allow mutual data communication.

The microprocessor 14 controls the elements of the consumer game device 11 based on an operating system stored in a ROM (not shown) and a program and data which are read from the optical disc 36 or the hard disk 26. The main memory 16 comprises, for example, a RAM. In the main memory 16, the program and data which are read from the optical disc 36 or the hard disk 26 are written as necessary. The main memory 16 is also used as a work memory of the microprocessor 14.

The image processing unit 18 comprises a VRAM. The image processing unit 18 draws a game screen on the VRAM based on image data which is sent from the microprocessor 14. The image processing unit 18 converts the game screen into a video signal and outputs the video signal to the monitor 32 at a predetermined timing.

The input/output processing unit 20 is an interface for the microprocessor 14 to access the sound processing unit 22, the optical disc reading unit 24, the hard disk 26, the communication interface 28, and the controller 30. The sound processing unit 22, the optical disc reading unit 24, the hard disk 26, the communication interface 28, and the controller 30 are connected to the input/output processing unit 20.

The sound processing unit 22 comprises a sound buffer. In the sound buffer, various sound data such as a game music, a game sound effect, and a message which are read from the optical disc 36 or the hard disk 26 are stored. The sound processing unit 22 reproduces various sound data stored in the sound buffer and outputs from the speaker 34.

The optical disc reading unit 24 reads the program and data recorded on the optical disc 36 according to an instruction from the microprocessor 14. In this configuration, the optical disc 36 is used for supplying the program and data to the consumer game device 11, but it is also possible to supply the program and data to the consumer game device 11 using any of other information storage media, such as a ROM card. In addition, the program and data may be supplied to the consumer game device 11 from a remote location through a communication network such as, for example, the Internet.

The hard disk 26 is a typical hard disk device (auxiliary storage device). The hard disk 26 stores program and data. For example, save data or the like is stored in the hard disk 26. The communication interface 28 is an interface for connecting the consumer game device 11 to a communication network such as the Internet in a wired or wireless fashion.

The controller 30 is a general-purpose operation inputting unit through which the player inputs various game operations. The input/output processing unit 20 scans states of the elements of the controller 30 every certain period (for example, every $1/60^{th}$ of a second). The input/output processing unit 20 sends an operation signal indicating the scan result through the bus 12 to the microprocessor 14. The microprocessor 14 determines the game operation of the player based on the operation signal. A plurality of controllers 30 can be connected to the consumer game device 11. The microprocessor 14 executes game control based on the operation signal which is input from the controllers 30.

In the game device 10 having the above-described structure, a game program which is read from the optical disc 36 or the hard disk 26 is executed so that a game, for example, a soccer game, is realized.

Figure 2:
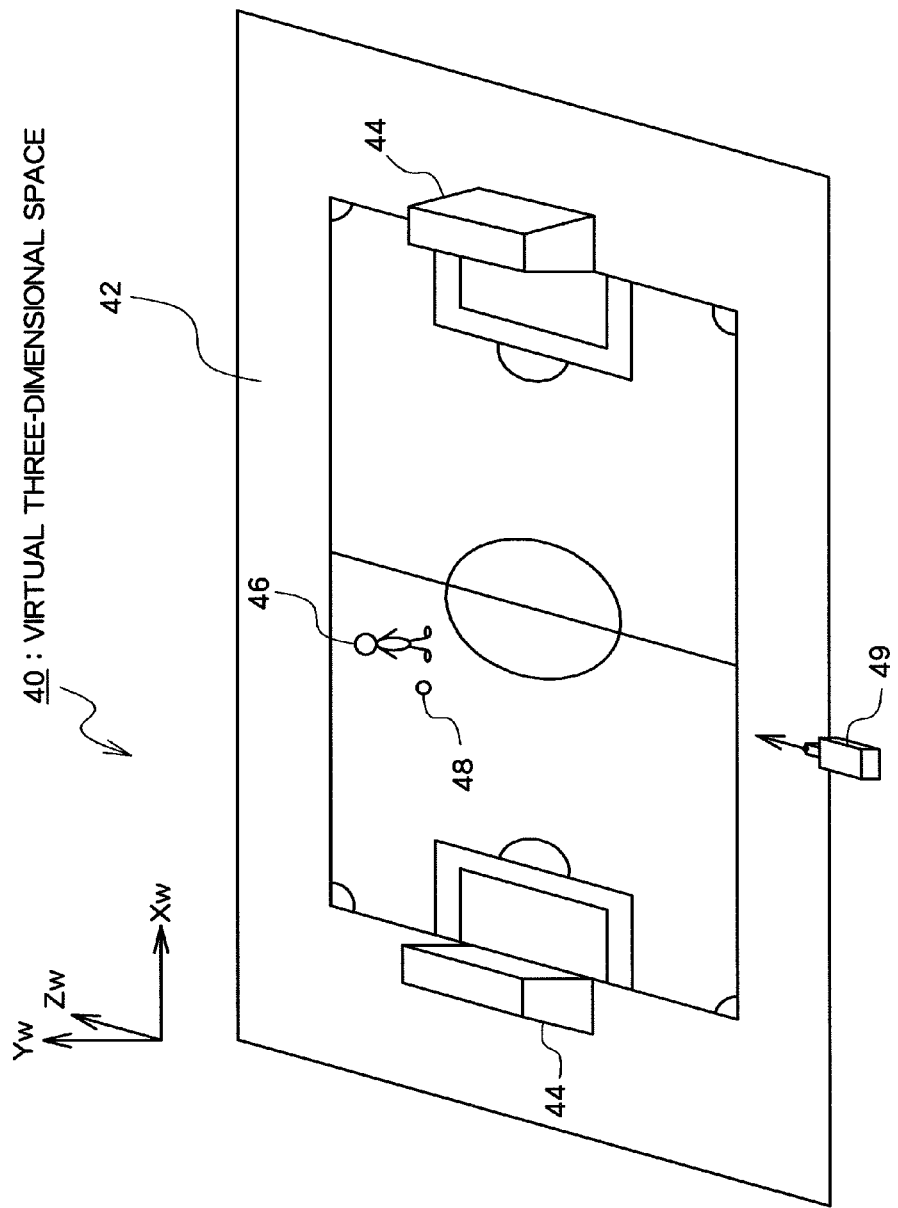
FIG. 2 is a diagram showing an example of a virtual three-dimensional space.
Figure 10:
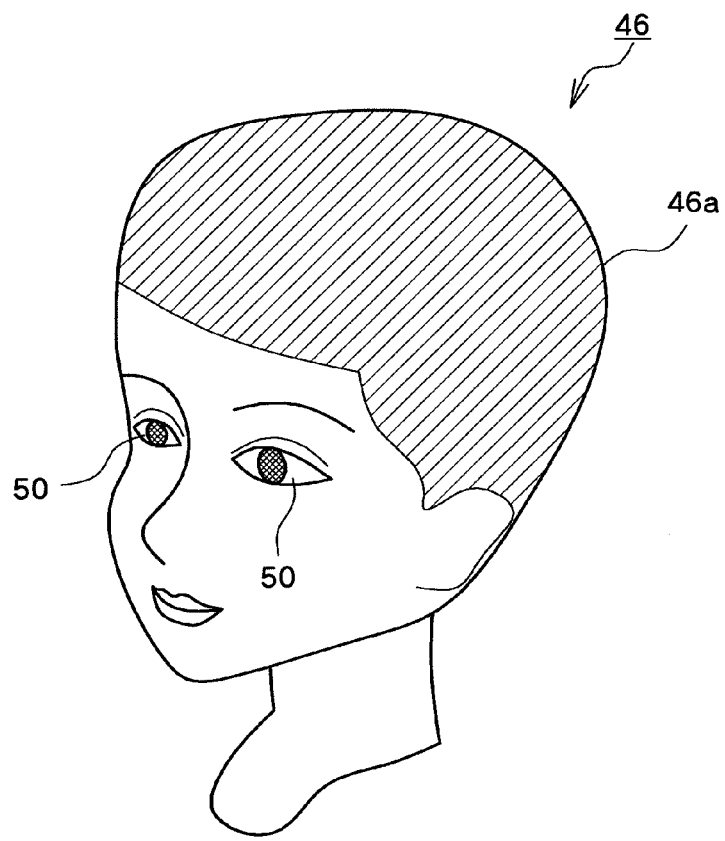
FIG. 10 is a diagram showing an example of an outer appearance of a character object.
Figure 11:
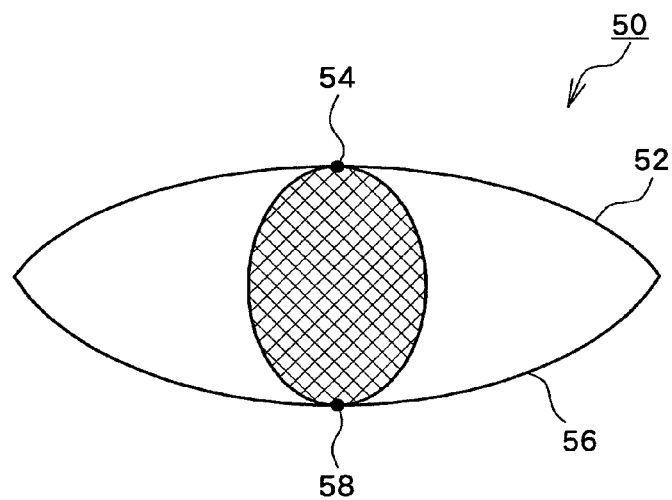
FIG. 11 is a diagram showing an example of a state of an eye of a character object.
Figure 12:
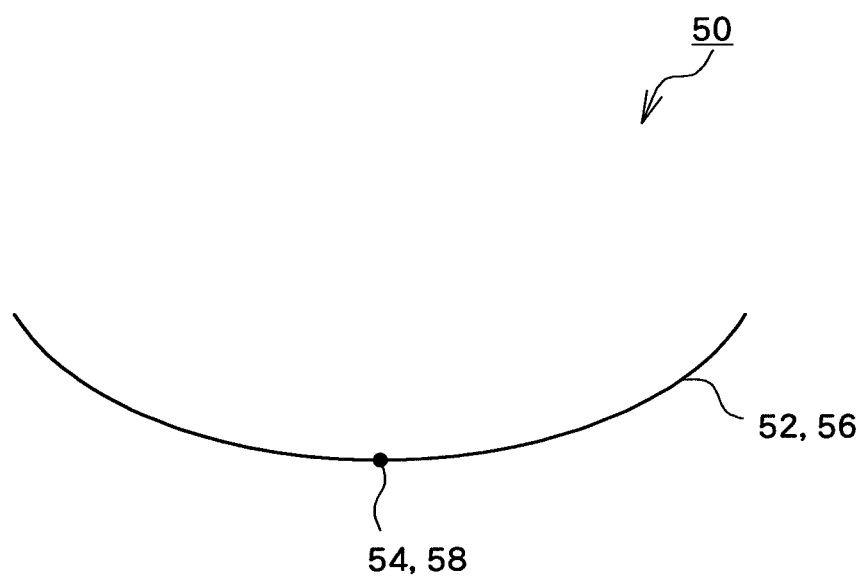
FIG. 12 is a diagram showing an example of a state of an eye of a character object.
Figure 14:
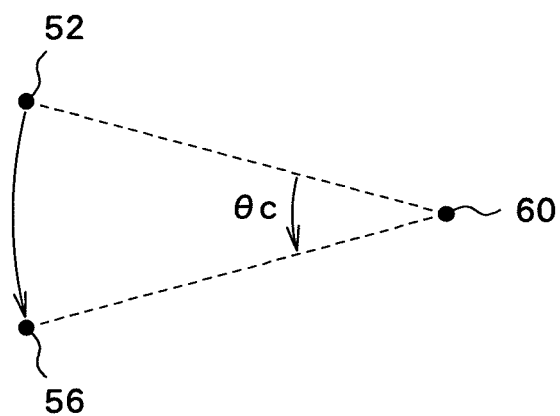
FIG. 14 is a diagram for explaining a relationship between an upper eyelid and a joint of a character object.

A virtual three-dimensional space is constructed in the main memory 16 of the game device 10. FIG. 2 shows an example of a virtual three-dimensional space 40. As shown in FIG. 2, in the virtual three-dimensional space 40, a soccer playing field is formed. That is, a field object 42 which represents a soccer field is placed in the virtual three-dimensional space 40. A goal object 44 which represents a goal, a character object 46 which represents a soccer player, and a ball object 48 which represents a soccer ball are placed on the field object 42. Although not shown in FIG. 2, 22 character objects 46 are placed in the virtual three-dimensional space 40. In addition, in FIG. 2, the character object 46 is simplified. The character object 46 has an outer appearance, for example, as shown in FIG. 10. Moreover, as shown in FIG. 13, for example, the character object 46 comprises a plurality of polygons, and a plurality of skeleton parts are set in the character object 46. The skeleton comprises a joint which corresponds to a joint portion and a bone which connects between joints. In the character object 46, for example, a joint 60 or the like as shown in FIG. 13 is set.

A virtual camera 49 is placed in the virtual three-dimensional space 40. A game screen representing a scene obtained by viewing the virtual three-dimensional space 40 from the virtual camera 49 is displayed on the monitor 32. The player operates the character object 46 to be operated using the controller 30 while viewing the game screen.

Figure 3:
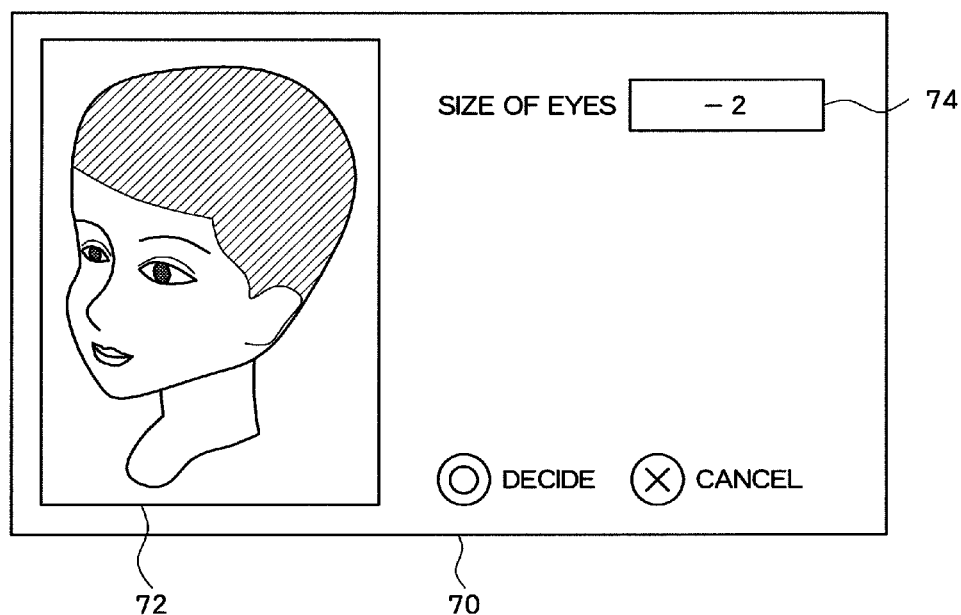
FIG. 3 is a diagram showing an example of a character transformation screen.

The soccer game has a character transformation function. FIG. 3 shows an example of a character transformation screen. A character transformation screen 70 shown in FIG. 3 is displayed by the microprocessor 14 (guiding unit) executing a program stored in the optical disc 36 or the hard disk 26. The character transformation screen 70 is a screen for guiding the player to change the size (narrowness) of the eye 50 of the character object 46. In other words, the character transformation screen 70 is a screen which guides the player to change positions of vertices (including the representative vertex 54 of the upper eyelid 52 and the representative vertex 58 of the lower eyelid 56) of the eye 50 of the character object 46. In the following description, a shape of the character object 46 before the transformation by the player, that is, the original shape of the eye 50 of the character object 46 generated by the game developer (designer), is referred to as an "initial shape".

The character transformation screen 70 includes a transformation result display region 72 and a transformation parameter display column 74. A transformation result of the character object 46 is displayed in the transformation result display region 72. A value of a transformation parameter indicating the degree of transformation of the character object 46 is displayed in the transformation parameter display column 74. In the case of the present embodiment, the value of the transformation parameter indicates how large or how narrow the eye 50 of the character object 46 is to be set.

When the value of the transformation parameter is less than 0, the eye 50 of the character object 46 becomes narrower than the initial shape. When, on the other hand, the value of the transformation parameter is larger than 0, the eye 50 of the character object 46 becomes larger than the initial shape. As the value of the transformation parameter is reduced, the eye 50 of the character object 46 is narrowed, and as the value of the transformation parameter is increased, the eye 50 of the character object 46 is enlarged. When the value of the transformation parameter is 0, the eye 50 of the character object 46 is set at the initial shape.

For example, every time the player presses an upward direction instruction button of the controller 30, the value of the transformation parameter displayed in the transformation parameter display column 74 is incremented by 1. Similarly, for example, every time the player presses a downward direction instruction button of the controller 30, the transformation parameter value displayed in the transformation parameter display column 74 is decremented by 1.

When the value of the transformation parameter is increased or decreased, the image of the character object 46 displayed in the transformation result display region 72 is updated. In this case, the size (narrowness) of the eye 50 of the character object 46 is updated in a manner described below.

Figure 4:
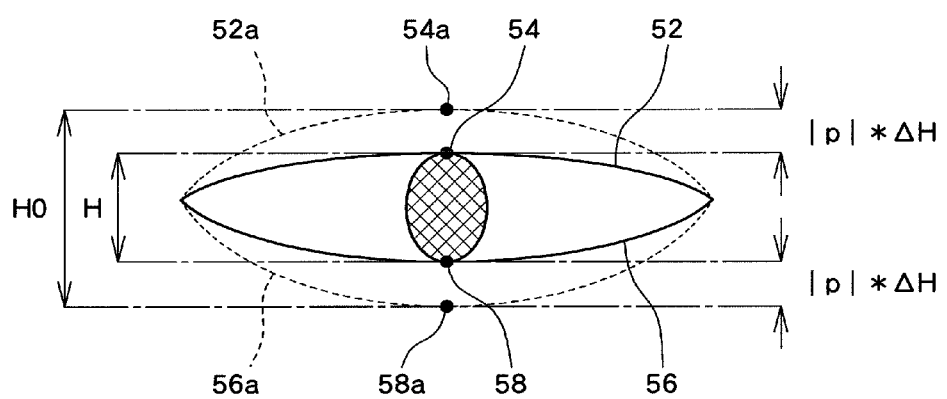
FIG. 4 is a diagram for explaining a transformation of an eye of a character object.

FIG. 4 is a diagram for explaining update of the size (narrowness) of the eye 50 of the character object 46. FIG. 4 shows a case where the transformation parameter is less than 0. In FIG. 4, reference numeral 52a represents the upper eyelid 52 when the eye 50 of the character object 46 has the initial shape, and reference numeral 54a represents a position (initial position) of the representative vertex 54 when the eye 50 of the character object has the initial shape. Similarly, reference numeral 56a represents the lower eyelid 56 when the eye 50 of the character object 46 has the initial shape, and reference numeral 58a represents a position (initial position) of the representative vertex 58 when the eye 50 of the character object 46 has the initial shape.

When the transformation parameter p is less than 0, as shown in FIG. 4, the position of the representative vertex 54 of the upper eyelid 52 is updated to a position moved from the initial position 54a of the representative vertex 54 in the downward direction by ($|p|*\Delta H$). $|p|$ represents an absolute value of the transformation parameter p and $\Delta H$ is a constant. In this case, the positions of other vertices of the upper eyelid 52 are also updated according to the position of the representative vertex 54. In addition, the position of the representative vertex 58 of the lower eyelid 56 is updated to a position moved from the initial position 58a of the representative vertex 58 in an upward direction by ($|p|*\Delta H$). In this case, the positions of the other vertices of the lower eyelid 56 are also updated according to the position of the representative vertex 58. As a result, a length H between the representative vertex 54 of the upper eyelid 52 and the representative vertex 58 of the lower eyelid 56 of the character object 46 is shortened by ($2*|p|*\Delta H$) compared to a length H0 in the case where the eye 50 of the character object 46 has the initial shape. In other words, the length in the vertical direction of the eye 50 of the character object 46 is shortened, and the eye 50 of the character object 46 is narrowed.

When, on the other hand, the transformation parameter p is larger than 0, the position of the representative vertex 54 of the upper eyelid 52 is updated to a position moved from the initial position 54a of the representative vertex 54 in the upward direction by ($|p|*\Delta H$). In this case, the positions of the other vertices of the upper eyelid 52 are also updated according to the position of the representative vertex 54. In addition, the position of the representative vertex 58 of the lower eyelid 56 is updated to a position moved from the initial position 58a of the representative vertex 58 in the downward direction by ($|p|*\Delta H$). In this case, the positions of the other vertices of the lower eyelid 56 are also updated according to the position of the representative vertex 58. As a result, the length H between the representative vertex 54 of the upper eyelid 52 of the character object 46 and the representative vertex 58 of the lower eyelid 56 is extended by ($2*|p|*\Delta H$) compared to the length H0 in the case where the eye 50 of the character object 46 has the initial shape. In other words, the length of the eye 50 of the character object 46 is extended in the vertical direction.

When the player presses a decision button of the controller 30 in the character transformation screen, the data indicating the transformation result is stored in the hard disk 26. For example, the value of the transformation parameter which is set by the player is stored in the hard disk 26. In addition, vertex data of the character object 46 after the transformation by the player are also stored in the hard disk 26. From this point on, the vertex data of the character object 46 after the transformation stored in the hard disk 26 is used when the game screen is generated. The character object 46 transformed by the player is displayed in the game screen.

Next, a technique for preventing an unnatural display of a scene of the character object 46 closing the eye 50 even when the size (narrowness) of the eye 50 of the character object 46 is changed, while suppressing the increase in the amount of data and amount of work related to the motion data, will be described.

First, the data to be stored in the game device 10 (optical disc 36 or hard disk 26) will be described. Motion data for closing the eye 50 of the character object 46 and position correction data of the joint 60 are stored in the game device 10.

The motion data for closing the eye 50 of the character object 46 is data which defines a change of a rotational angle (rotational angle in the A direction with the X axis as the rotational axis) of the joint 60 at every predetermined period (for example, every $1/60^{th}$ of a second) in the case where the character object 46 closes the eye 50. In the present embodiment, one motion data for closing the eye 50 of the character object 46 is stored. In addition, the motion data is data indicating a gradual rotation of the joint 60 in the A direction with the X axis as the rotational axis until the rotational angle of the joint 60 reaches a predetermined angle θc (for example, 30°).

Figures 5, 6:
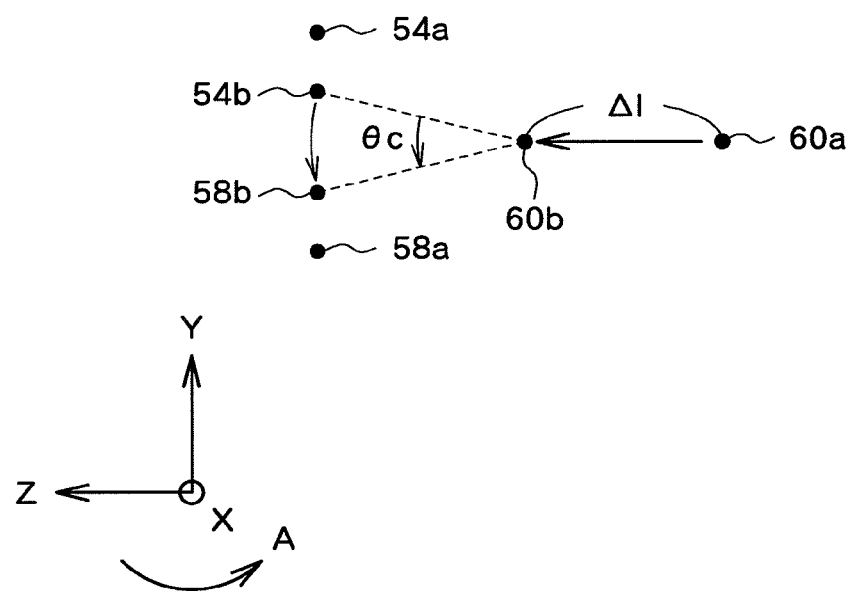
FIG. 5 is a diagram showing an example of position correction data of a joint.
FIG. 6 is a diagram for explaining a method of determining a value of a position correction parameter.

FIG. 5 shows an example of position correction data of the joint 60. As shown in FIG. 5, the position correction data of the joint 60 is data in which a transformation parameter p and a position correction parameter Δl (correction information) are correlated. The position correction parameter Δl is a parameter which indicates how far the position of the joint 60 is to be moved in the positive or negative direction along the Z axis.

Because the base positions of the representative vertex 54 of the upper eyelid 52 and the representative vertex 58 of the lower eyelid 56 of the character object 46 (first position and second position) are determined based on the value of the transformation parameter p as described above, the position correction data shown in FIG. 5 can be considered as data in which conditions related to the base positions of the representative vertex 54 of the upper eyelid 52 and the representative vertex 58 of the lower eyelid 56 and the position correction parameter Δl are correlated. In addition, as described above, when, for example, the value of the transformation parameter p is less than 0, a distance H between the representative vertex 54 of the upper eyelid 52 and the representative vertex 58 of the lower eyelid 56 of the character object 46 is (H0−2*|p|*ΔH), as shown in FIG. 4. When, for example, the transformation parameter p is larger than 0, the distance H between the representative vertex 54 of the upper eyelid 52 and the representative vertex 58 of the lower eyelid 56 of the character object 46 is (H0+2*|p|*ΔH). Because of this, the position correction data shown in FIG. 5 may also be considered as data in which a condition related to the distance between the representative vertex 54 of the upper eyelid 52 and the representative vertex 58 of the lower eyelid 56 and the position correction parameter Δl are correlated.

Figure 7:
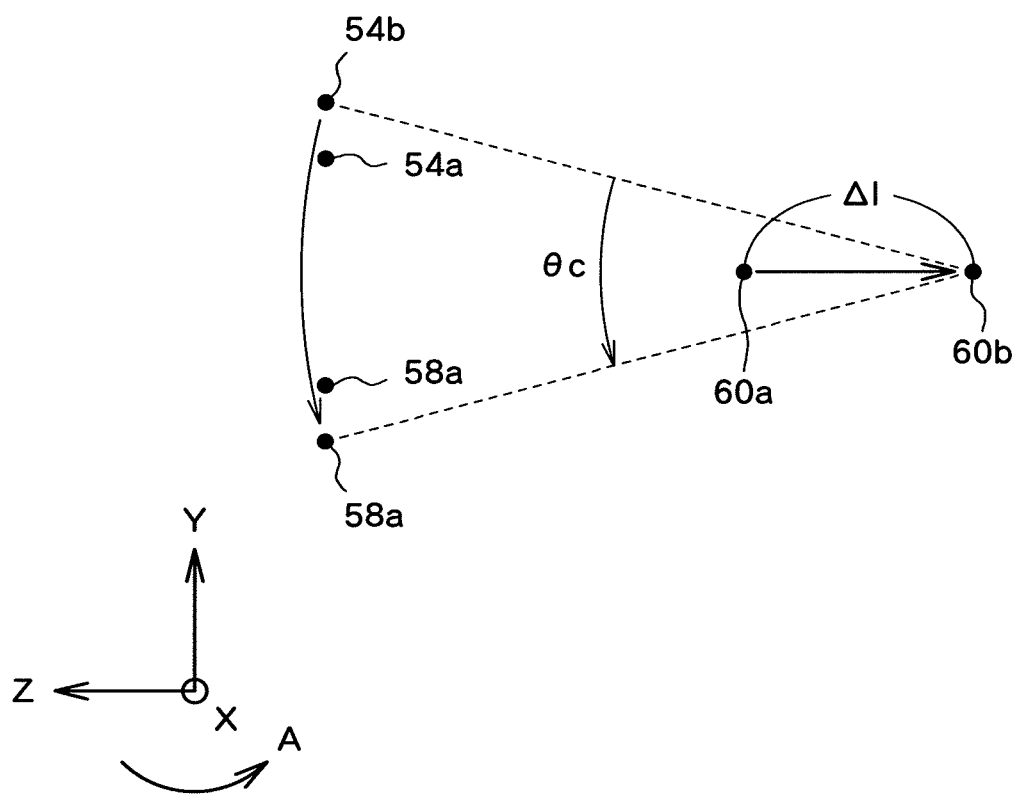
FIG. 7 is a diagram for explaining a method of determining a value of a position correction parameter.

Next a method of determining the value of the position correction parameter Δl corresponding to the value of the transformation parameter p will be described. FIG. 6 shows a method of determining the value of the position correction parameter Δl when the transformation parameter p is less than 0. FIG. 7 shows a method of determining the value of the position correction parameter Δl when the transformation parameter p is larger than 0. Similar to FIG. 4, reference numeral 54a indicates the position (initial position) of the representative vertex 54 of the upper eyelid 52 when the eye 50 of the character object 46 has the initial shape and reference numeral 58a indicates the position (initial position) of the representative vertex 58 of the lower eyelid 56 when the eye 50 of the character object 46 has the initial shape. Reference numeral 60a indicates an initial position of the joint 60. The initial position of the joint 60 refers to a position of the joint 60 before the position of the joint 60 is corrected. That is, the initial position of the joint 60 is an original position of the joint 60 which is set by the game developer (designer).

When the value of the position correction parameter Δl corresponding to the value of the transformation parameter p is determined, first, a transformed position 54b of the representative vertex 54 of the upper eyelid 52 and a transformed position 58b of the representative vertex 58 of the lower eyelid 56 are acquired. When the transformation parameter p is less than 0, the transformed position 54b of the representative vertex 54 of the upper eyelid 52 is at a position moved from the initial position 54a of the representative vertex 54 in the downward direction (negative direction along Y axis) by (|p|*ΔH). The transformed position 58b of the representative vertex 58 of the lower eyelid 56 is at a position moved from the initial position 58a of the representative vertex 58 in the upward direction (positive direction along Y axis) by (|p|*ΔH). When, on the other hand, the transformation parameter p is greater than 0, the transformed position 54b of the representative vertex 54 of the upper eyelid 52 is at a position moved from the initial position 54a of the representative vertex 54 in the upward direction (positive direction along Y axis) by (|p|*ΔH). The transformed position 58b of the representative vertex 58 of the lower eyelid 56 is at a position moved from the initial position 58a of the representative vertex 58 in the downward direction (negative direction along Y axis) by (|p|*ΔH).

After the transformed position 54b of the representative vertex 54 of the upper eyelid 52 and the transformed position 58b of the representative vertex 58 of the lower eyelid 56 are acquired, a position of the joint 60 which satisfies the following condition is acquired as a correction target position 60b. Specifically, a position of the joint 60 which results in the representative vertex 54 of the upper eyelid 52 being moved from the transformed position 54b of the representative vertex 54 to the transformed position 58b of the representative vertex 58 in the case where the joint 60 is rotated with the X axis as the rotational axis, in the A direction, and by a predetermined angle θc (for example, 30°), is acquired as the correction target position 60b. In the case of the present embodiment, the correction target position 60b of the joint 60 is acquired by moving the joint 60 from the initial position 60a in the positive or negative direction along the Z axis.

After the correction target position 60b of the joint 60 is acquired, next, a difference between the correction target position 60b of the joint 60 and the initial position 60a of the joint 60 is acquired as the position correction parameter Δl. When the correction target position 60b of the joint 60 is at a positive direction side along the Z axis from the initial position 60a of the joint 60, the position correction parameter Δl is set to a positive value. When the correction target position 60b of the joint 60 is at a negative direction side along the Z axis from the initial position 60a of the joint 60, the position correction parameter Δl is set to a negative value.

The value of the position correction parameter Δl corresponding to the value of the transformation parameter p is determined in the above-described manner, and the position correction data of the joint 60 is generated. The position correction data of the joint 60 may be data in a table format or data in an equation format. Alternatively, the position correction data of the joint 60 may be data in a format that is a combination of data in table format and data in equation format.

Figure 8:
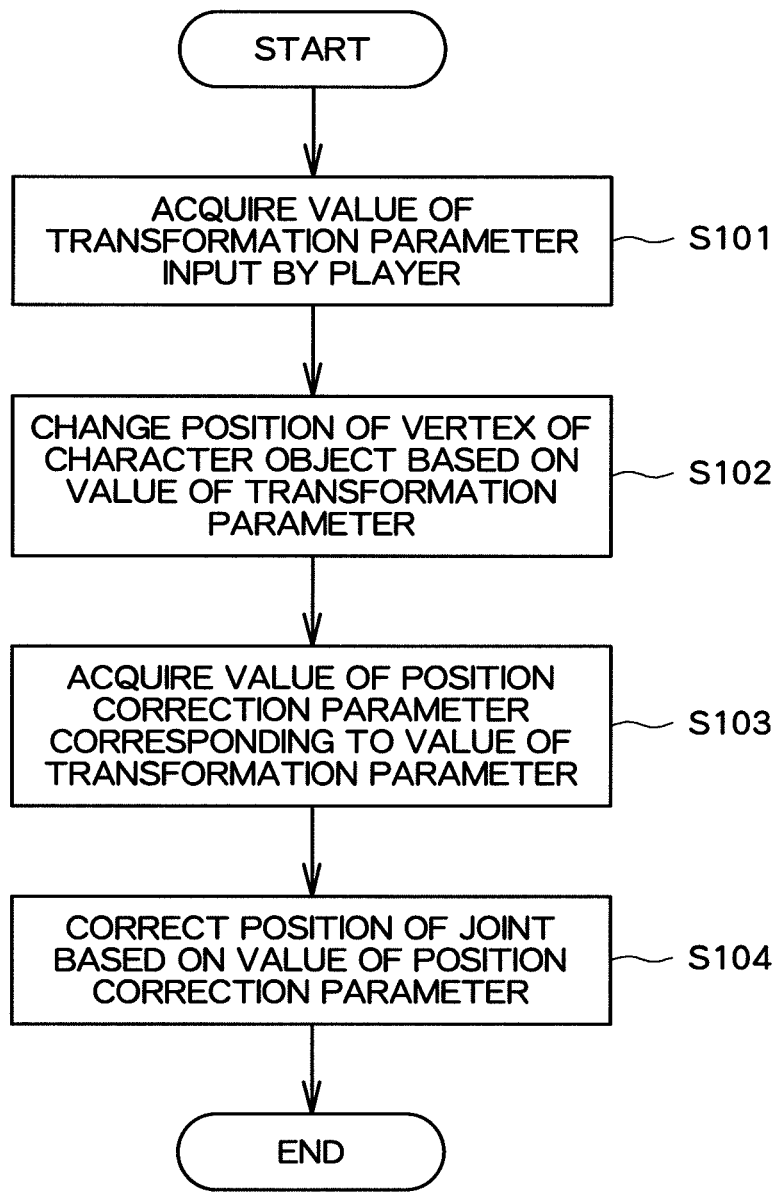
FIG. 8 is a flowchart showing a process executed by a game device.

Next, a process executed by the game device 10 will be described. FIG. 8 is a flowchart showing a process which is executed in the case where the decision button is pressed in the character transformation screen 70. The microprocessor 14 executes a process shown in FIG. 8 according to a program stored in the optical disc 36 or the hard disk 26.

As shown in FIG. 8, the microprocessor 14 acquires a value of the transformation parameter which is input by the player in the character transformation screen 70 (S101). In this case, the microprocessor 14 stores the value of the transformation parameter which is input by the player in the hard disk 26.

Then, the microprocessor 14 changes the positions of the vertices of the eye 50 of the character object 46 based on the value of the transformation parameter acquired in S101 (S102). That is, the microprocessor 14 transforms the eye 50 of the character object 46 based on the value of the transformation parameter acquired in S101.

For example, if the transformation parameter p is less than 0, the microprocessor 14 updates the position of the representative vertex 54 of the upper eyelid 52 of the character object 46 to a position moved from the initial position 54a of the representative vertex 54 in the downward direction by (|p|*ΔH) (refer to FIG. 4). The microprocessor 14 also updates the positions of the other vertices of the upper eyelid 52 according to the position of the representative vertex 54 (refer to FIG. 4). The microprocessor 14 updates the position of the representative vertex 58 of the lower eyelid 56 of the character object 46 to a position moved from the initial position 58a of the representative vertex 58 in the upward direction by (|p|*ΔH) (refer to FIG. 4). The microprocessor 14 also updates the positions of the other vertices of the lower eyelid 56 according to the position of the representative vertex 58 (refer to FIG. 4).

On the other hand, if, for example, the transformation parameter p is greater than 0, the microprocessor 14 updates the position of the representative vertex 54 of the upper eyelid 52 of the character object 46 to a position moved from the initial position 54a of the representative vertex 54 in the upward direction by (|p|*ΔH). The microprocessor 14 also updates the positions of the other vertices of the upper eyelid 52 according to the position of the representative vertex 54. The microprocessor 14 updates the position of the representative vertex 58 of the lower eyelid 56 of the character object 46 to a position moved from the initial position 58a of the representative vertex 58 in the downward direction by (|p|*ΔH). The microprocessor 14 also updates the positions of the other vertices of the lower eyelid 56 according to the position of the representative vertex 58.

The microprocessor 14 stores the vertex data of the character object 46 after the transformation in the hard disk 26.

The microprocessor 14 (correcting means) also acquires the value of the position correction parameter corresponding to the value of the transformation parameter acquired in S101, based on the position correction data of the joint 60 (refer to FIG. 5) (S103). Then, the microprocessor 14 (correcting means) corrects the position of the joint 60 based on the position correction parameter acquired in S103 (S104). More specifically, the microprocessor 14 adds the value of the position correction parameter acquired in S103 to the initial position (coordinate value of Z axis) of the joint 60, to acquire the correction position of the joint 60. In this case, the position of the joint 60 is corrected such that the representative vertex 54 of the upper eyelid 52 of the character object 46 would move from the base position (first position) to the position (second position) of the representative vertex 58 of the lower eyelid 56 in a case where the joint 60 is rotated by a predetermined angle θc (for example, 30°). The microprocessor 14 stores the position data after correction of the joint 60 in the hard disk 26.

If the correction of the position of the joint 60 is completed, the present process is completed. From this point on, the game screen where the character object 46 appears is generated based on the vertex data of the character object 46 after transformation and the position data of the joint 60 after correction, which are stored in the hard disk 26. As a result, the character object 46 with the size (narrowness) of the eye 50 changed by the player is displayed on the game screen.

In the game device 10, in a case where the size (narrowness) of the eye 50 of the character object 46 is changed by the player, the position of the joint 60 for controlling opening and closing of the eye 50 is changed. The correction of the position of the joint 60 is executed based on the position correction data shown in FIG. 5. As a result, even when the size (narrowness) of the eye 50 of the character object 46 is changed, if the motion data (motion data for closing the eye 50 of the character object 46) is reproduced, that is, if the joint 60 is rotated with the X axis as the rotational axis, in the A direction, and by a predetermined angle θc (for example, 30°), the upper eyelid 52 moves to the lower eyelid 56. For example, the representative vertex 54 of the upper eyelid 52 (predetermined vertex) moves from the base position (first position) to the position (second position) of the representative vertex 58 of the lower eyelid 56. For example, even in the case where the eye 50 of the character object 46 is transformed to be narrower than the initial shape, if the joint 60 is rotated by a predetermined angle θc (for example, 30°), the upper eyelid 52 does not penetrate through the lower eyelid 56. In addition, for example, even in the case where the eye 50 of the character object 46 is set larger than the initial shape, if the joint 60 is rotated by a predetermined angle θc (for example, 30°), the eye 50 of the character object 46 can be set to the completely closed state. In other words, in a case where the motion data is reproduced, the eye 50 always preferably changes from the completely open state to the completely closed state.

As described, with the game device 10, it is possible to prevent unnatural display of the scene of the character object 46 closing the eye 50 even when the size (narrowness) of the eye 50 of the character object 46 is changed.

In addition, with the game device 10, it is not necessary to prepare a plurality of types of motion data corresponding to the size (narrowness) of the eye 50 of the character object 46. In other words, the increase in the amount of data and amount of work related to the motion data is suppressed.

The present invention is not limited to the above-described preferred embodiment.

For example, the present invention can be applied to cases other than preventing the unnatural display of the scene of the character object 46 closing the eye 50 even when the size (narrowness) of the eye 50 of the character object 46 is changed. For example, the present invention can be applied to a case of preventing unnatural display of the character object 46 closing the mouth even when the size of the mouth of the character object 46 is changed.

Alternatively, for example, the present invention can be applied to games different from the soccer game.

Figure 9:
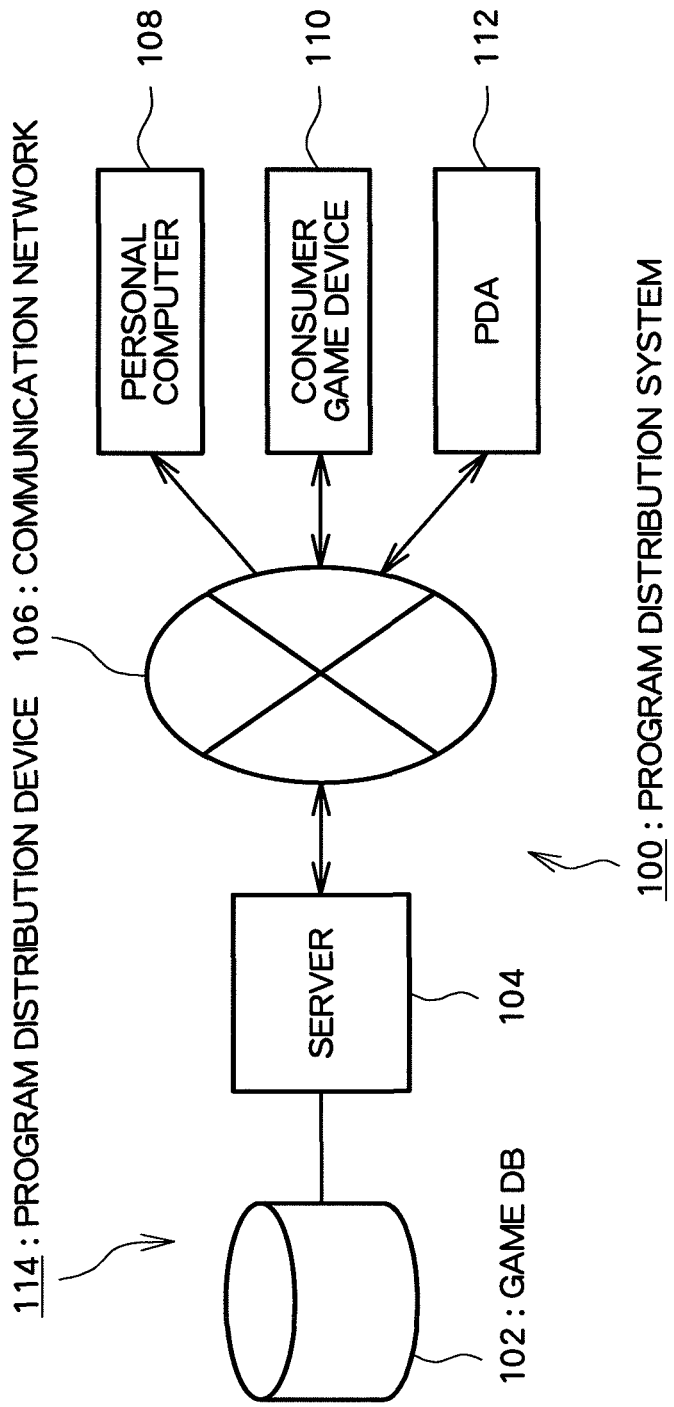
FIG. 9 is a diagram showing an overall structure of a program distribution system according to another embodiment of the present invention.

In addition, for example, in the above description, the program is supplied from the optical disc 36, which is an information storage medium, to the consumer game device 11. However, the program may be distributed to the home or the like through a communication network. FIG. 9 is a diagram showing an overall structure of a program distribution system which uses a communication network. A program distribution method according to the present invention will be described with reference to FIG. 9. As shown in FIG. 9, the program distribution system 100 comprises a game database 102, a server 104, a communication network 106, a personal computer 108, a consumer game device 110, and a PDA (Personal Digital Assistant) 112. Of these, the game database 102 and the server 104 form a program distribution device 114. The communication network 106 comprises, for example, the Internet and a cable television network. In this system, a program similar to the stored content of the optical disc 36 is stored in the game database (information storage medium) 102. When the demander requests distribution of a game using the personal computer 108, the consumer game device 110, the PDA 112, or the like, the request is transmitted through the communication network 106 to the server 104. The server 104 reads the program from the game database 102 in response to the game distribution request, and transmits the program to the game distribution requesting device such as the personal computer 108, the consumer game device 110, the PDA 112, or the like. In the described example, the game is distributed in response to the game distribution request, but it is also possible to transmit the game from the server 104 in a one-sided way. In addition, not all programs necessary for realizing the game need to be distributed at once (package distribution), and the necessary portion may be distributed according to the phase of the game (split distribution). By distributing the game via the communication network 106 in this manner, it is possible for the demander to easily obtain the program.

The invention claimed is:

1. A game device in which a skeleton part which is set for a character object placed in a virtual three-dimensional space is rotated so that a position of a vertex of the character object changes from a first position to a second position, the game device comprising:
   guiding means for guiding a player to change at least one of the first position and the second position by inputting a transformation parameter; and
   correcting means for correcting, in a case where at least one of the first position and the second position is changed by the player inputting the transformation parameter, a position of the skeleton part indicative of a joint so that the position of the vertex of the character object changes from the first position to the second position in a case where the skeleton part is rotated by an angle,
   wherein the transformation parameter input by the player via the guiding means indicates a transformation in a size of a body part of the character object, and
   wherein
   the correcting means corrects the position of the skeleton part based on position correction data in which a condition related to at least one of the first position and the second position, and correction information which is a basis for correction of the position of the skeleton part, are correlated,
   wherein the correcting means corrects the position of the skeleton part based on the correction information corresponding to the condition satisfied by at least one of the first position and the second position in a case where at least one of the first position and the second position is changed by the player.

2. The game device according to claim 1, wherein the condition is a condition related to a distance between the first position and the second position.

3. The game device according to claim 1, wherein the correction information is information indicating a movement distance of the skeleton part in a direction, and
   the correcting means moves the skeleton part in the direction by a movement distance indicated by the correction information corresponding to the condition satisfied by at least one of the first position and the second position.

4. A method of controlling a game device in which a skeleton part which is set for a character object placed in a virtual three-dimensional space is rotated so that a position of a vertex of the character object changes from a first position to a second position, the method comprising:
   guiding, by a processor, a player to change at least one of the first position and the second position by inputting a transformation parameter; and
   correcting, by the processor, in a case where at least one of the first position and the second position is changed by the player inputting the transformation parameter, the position of the skeleton part indicative of a joint so that the position of the vertex of the character object changes from the first position to the second position in a case where the skeleton is rotated by an angle,
   wherein the transformation parameter input by the player via the guiding means indicates a transformation in a size of a body part of the character object, and
   wherein the position of the skeleton part is corrected based on position correction data in which a condition related to at least one of the first position and the second position, and correction information which is a basis for correction of the position of the skeleton part, are correlated,
   wherein the position of the skeleton part is corrected based on the correction information corresponding to the condition satisfied by at least one of the first position and the second position in a case where at least one of the first position and the second position is changed by the player.

5. A computer program stored on a non-transitory computer-readable medium for causing a computer to function as a game device in which a skeleton part which is set for a character object placed in a virtual three-dimensional space is rotated so that a position of a vertex of the character object changes from a first position to a second position, the program causing the computer to:
   guide a player to change at least one of the first position and the second position by inputting a transformation parameter; and
   correct, in a case where at least one of the first position and the second position is changed by the player inputting the transformation parameter, a position of the skeleton part indicative of a joint so that the position of the vertex of the character object changes from the first position to the second position in a case where the skeleton part is rotated by an angle,
   wherein the transformation parameter input by the player via the guiding means indicates a transformation in a size of a body part of the character object, and
   wherein
   the position of the skeleton part is corrected based on position correction data in which a condition related to at least one of the first position and the second position, and correction information which is a basis for correction of the position of the skeleton part, are correlated,
   wherein the position of the skeleton part is corrected based on the correction information corresponding to the condition satisfied by at least one of the first position and the second position in a case where at least one of the first position and the second position is changed by the player.

6. A non-transitory computer-readable information storage medium which stores a program for causing a computer to function as a game device in which a skeleton part which is set for a character object placed in a virtual three-dimensional space is rotated so that a position of a vertex of the character object changes from a first position to a second position, the program causing the computer to:

guide a player to change at least one of the first position and the second position by inputting a transformation parameter; and correct, in a case where at least one of the first position and the second position is changed by the player inputting the transformation parameter, a position of the skeleton part indicative of a joint so that the position of the vertex of the character object changes from the first position to the second position in a case where the skeleton part is rotated by an angle, wherein the transformation parameter input by the player via the guiding means indicates a transformation in a size of a body part of the character object, and wherein the position of the skeleton part is corrected based on position correction data in which a condition related to at least one of the first position and the second position, and correction information which is a basis for correction of the position of the skeleton part, are correlated, wherein the position of the skeleton part is corrected based on the correction information corresponding to the condition satisfied by at least one of the first position and the second position in a case where at least one of the first position and the second position is changed by the player.

7. The game device according to claim 2, wherein the correction information is information indicating a movement distance of the skeleton part in a predetermined direction, and the correcting means moves the skeleton part in the predetermined direction by a movement distance indicated by the correction information corresponding to the condition satisfied by at least one of the first position and the second position.

8. The method of claim 4, wherein the condition is a condition related to a distance between the first position and the second position.

9. The method of claim 4, wherein the correction information is information indicating a movement distance of the skeleton part in a direction, and the correcting moves the skeleton part in the direction by a movement distance indicated by the correction information corresponding to the condition satisfied by at least one of the first position and the second position.

10. The computer program on the non-transitory medium of claim 5, wherein the condition is a condition related to a distance between the first position and the second position.

11. The computer program on the non-transitory medium of claim 5, wherein the correction information is information indicating a movement distance of the skeleton part in a direction, and the skeleton part is moved in the direction by a movement distance indicated by the correction information corresponding to the condition satisfied by at least one of the first position and the second position.

12. The non-transitory computer-readable information storage medium of claim 6, wherein the condition is a condition related to a distance between the first position and the second position.

13. The non-transitory computer-readable information storage medium of claim 6, wherein the correction information is information indicating a movement distance of the skeleton part in a direction, and the skeleton part is moved in the direction by a movement distance indicated by the correction information corresponding to the condition satisfied by at least one of the first position and the second position.

14. The game device according to claim 1, wherein the correcting means moves the position of the skeleton part in relation to the position of the vertex of the character object according to an amount of the transformation parameter.

15. The game device according to claim 1, wherein the skeleton part is rotated through a rotation angle so that a position of the vertex of the character object changes from the first position to the second position, and wherein the correcting means moves a position of the skeleton part to a new position so that when the skeleton part is rotated through the rotation angle the position of the vertex of the character object changes between the changed at least one first position and second position indicated by the guiding means.

* * * * *